United States Patent Office 3,299,039
Patented Jan. 17, 1967

3,299,039
MIXED TERNARY COMPLEX OF MONOAZO COMPOUNDS
Ugo Moiso and Sisto Sergio Papa, Milan, Italy, assignors to Aziende Colori Nazionali Affini ACNA S.p.A., Milan, Italy
No Drawing. Filed Apr. 15, 1963, Ser. No. 272,839
Claims priority, application Italy, Apr. 18, 1962, 7,640/62
3 Claims. (Cl. 260—145)

The present invention relates to a novel metallized azo dye of black shade, which dye is particularly suitable for dyeing natural or synthetic polyamide fibers, especially wool and nylon. More particularly, this invention relates to a novel mixed ternary complex of chromium with the following monoazo dyes:

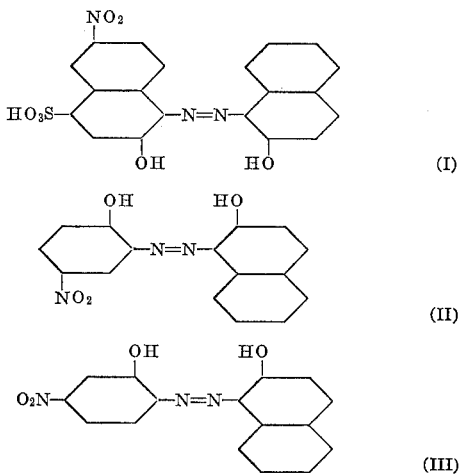

The three monoazo dyes are contained in the complex in molar ratios of 50% of (I), 25–28% of (II) and 25–22% of (III).

The foregoing complex dye is prepared in practice by reacting, in a non-aqueous medium, preferably in an anhydrous phase constituted by a mixture of urea and ethyleneglycol (or a derivative of ethyleneglycol), at temperatures of from about 110 to 140° C. and more preferably from about 125 to 130° C., for a time comprised between about 90 and 120 minutes, the product obtained by metallizing with chromium the compound (I) (in which product the azo compound and chromium are present in a molar ratio of 1:1), together with a mixture containing from about 50–56 mole percent of azo compound (II) and about 50–44 mole percent of azo compound (III), respectively. For each mole of metallized azo (I), one mole of the mixture of azo compounds (II) and (III) is employed.

Desirably, the anhydrous phase contains from about 20 to 40 grams of ethyleneglycol and 80 to 120 grams of urea for 0.1 gram mole of mixture of azo compounds. Instead of ethyleneglycol a derivative thereof may be employed, e.g., methyl-ester thereof may be used.

The resulting complex product is a unitary dye of black shade. This dye is very suitable for dyeing wool and synthetic polyamide fibers in a neutral or weakly acidic bath, and exhibits great fastness to wet treatments and to light.

Moreover, such dye retains a high solubility in slightly acidic pH media, so that the dye may be profitably employed in continuous dyeing.

It has also been found that if one maintains constant the amount of the metallized compound (I) while increasing the amount of compound (III) with respect to compound (II) (always within specified limits), the dye shade changes from a reddish-black to a blueish-black. This is observed as the percentage of compound (III) in the mixture of azoic compounds (II) and (III) is raised from 44 to 50%.

The results of the present invention are surprising inasmuch as it has been found that a dye with the above mentioned characteristics is obtained only by the technique previously described, that is: (a) metallizing with chromium, in a molar ratio 1:1, the azo compound I; (b) forming, in the absence of water, the ternary complex dye by reacting of the chromium complex (1:1) of the azo compound I with the azo compounds II and III.

For instance, when a mixture of the three monoazo compounds is metallized with chromium in a single phase in the given ratios, there results a product having vastly poorer dye characteristics so that such product has no practical applicability.

Moreover, if the reaction is carried out in aqueous rather than anhydrous conditions, even using the correct sequence and proportions, then a dye with much more reddish black shade is obtained. This dye exhibits characteristics which are much less desirable than those of the dye obtained under anhydrous conditions, particularly as regards its affinity for polyamide fibers in neutral or acidic baths, its shade, purity, and rayon reserve. Such negative characteristics preclude its employment commercially.

It has also been found that it is impossible to obtain a dye having good characteristics when mechanical mixtures of binary chromium complexes of monoazo compounds I and II and/or I and III are prepared.

The following examples will further illustrate the invention:

*Example 1*

A. An intimate mixture consisting of 0.5 g. mole of monoazo compound I metallized with chromium (1:1 molar ratio)
0.28 g. mole of monoazo compound II
0.22 g. mole of monoazo compound III is charged into a mixture of 1000 g. urea and 250 ml. ethyleneglycol. The whole is heated up to 125° C. and this temperature is maintained from 1½ to 2 hours in order to complete the formation of the mixed complex compound. The reaction mass is discharged into 5000 ml. of water, is then filtered while adding diatomite, then heated at 75° C., salted out at 15%, filtered, washed with 10% brine, and dried at 80° C.

The resulting dye dyes wool and synthetic polyamide fibers a reddish black and the dye has very good fastness to light and wetting, in neutral or slightly acid bath.

B. When the same dye is prepared while carrying out the metallization in aqueous phase (hereinafter described), a product with vastly poorer dyeing characteristics is obtained.

In 700 ml. of water are charged at 80° C.:

0.05 g. mole of monoazo compound I metallized with chromium (1:1 molar)
0.028 g. mole of monoazo compound II
0.022 g. mole of monoazo compound III The pH is adjusted to 10–10.5 by adding 36° Bé caustic soda. The mixture is made to boil and is kept at boiling for 4 hours in order to bring to completion the formation of the mixed complex. After dilution to 1 liter with water, it is filtered while adding diatomite, acidified up to a slightly acid reaction to Congo red, heated to 75° C., salted out at 15%, and is then filtered and dried at 80° C. The obtained dye dyes wool and polyamide fibers a very turbid reddish-black shade. It shows characteristics of purity, affinity (in neutral or acidic bath) and ray on reserve which are sharply lower than the corresponding characteristics exhibited by the dye of Example 1A.

Example 2

0.5 g. mole of the monoazo compound I metallized with chromium (1:1 molar)
0.25 g. mole of monoazo compound II
0.25 g. mole of monoazo compound III are allowed to react, under the anhydrous conditions described in Example 1(A). The subsequent procedure was as described from Example 1(A). The resultant dye has a shade which is much more blueish-black than the dye of Example 1(A), but the desirable dyeing characteristics and the applicability remain the same as in Example 1(A).

Example 3

Black dyes with characteristics equivalent to those of Examples 1(A) and 2 are obtained using the procedure of Example 1(A), but employing, instead of ethyleneglycol, the mono-methylether thereof (ml. 250), the remaining quantities and operative conditions being the same.

Variations can of course be made without departing from the spirit of our invention.

Having thus described our invention, what we desire to secure and claim by Letters Patent is:

1. A metallized azo dye having a black shade, said dye being the mixed chromium ternary complex of the following monoazo compounds:

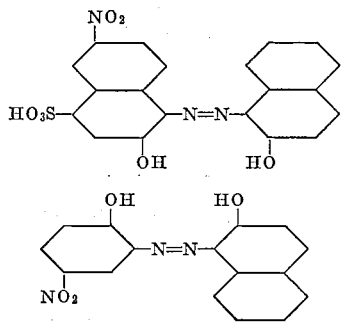

(I)

(II)

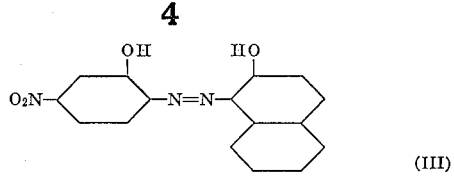

(III)

said monoazo compounds being present in the complex in molar ratios of 50% (I), 25–28% (II), and correspondingly 25–22% (III).

2. A process for preparing the metallized azo dye of claim 1, this process comprising reacting at a temperature of from about 110 to 140° C. in an anhydrous medium comprising a mixture of urea and a compound selected from the group consisting of ethyleneglycol and the methyl ester and methyl ether of ethyleneglycol the product of metallization with chromium of monoazo compound (I), the molar ratio of chromium to monoazo compound (I) in said metallized product being 1:1, with a mixture of monoazo compounds (II) and (III), the molar ratio of metallized product to said mixture being 1:1, said mixture containing from about 50 to 56 molar percent monoazo compound (II) and correspondingly from about 50 to 44 molar percent of monoazo compound (III).

3. The process of claim 2 wherein the reaction is carried out at a temperature of from about 125° to 130° C.

References Cited by the Examiner

UNITED STATES PATENTS

| | | | |
|---|---|---|---|
| 1,989,567 | 1/1935 | Straub et al. | 260—145 |
| 2,806,760 | 9/1957 | Brassel et al. | |
| 2,933,489 | 4/1960 | Biedermann et al. | 260—151 XR |
| 2,991,280 | 7/1961 | Schetty | 260—151 |

CHARLES B. PARKER, *Primary Examiner.*

NORMA S. MILESTONE, *Assistant Examiner.*